(No Model.)  2 Sheets—Sheet 1.

G. HURST.
LOBSTER TRAP.

No. 411,746. Patented Sept. 24, 1889.

Witnesses:
John Grist
R. Rauscher

Inventor:
George Hurst
By Henry Grist
Att'y.

(No Model.) 2 Sheets—Sheet 2.

G. HURST.
LOBSTER TRAP.

No. 411,746. Patented Sept. 24, 1889.

Witnesses:
John Grist
R. Rauscher

Inventor:
George Hurst
By Henry Grist
Atty.

UNITED STATES PATENT OFFICE.

GEORGE HURST, OF CANSO, NOVA SCOTIA, CANADA, ASSIGNOR OF ONE-HALF TO HENRY L. FORHAN, OF RAYMOND, MAINE.

LOBSTER-TRAP.

SPECIFICATION forming part of Letters Patent No. 411,746, dated September 24, 1889.

Application filed April 3, 1889. Serial No. 305,904. (No model.)

*To all whom it may concern:*

Be it known that I, GEORGE HURST, of Canso, in the county of Guysborough, in the Province of Nova Scotia, in the Dominion of Canada, have invented certain new and useful Improvements in Lobster-Traps; and I do hereby declare that the following is a full, clear, and exact description of the same, reference being had to the accompanying drawings, in which—

Figure 1:
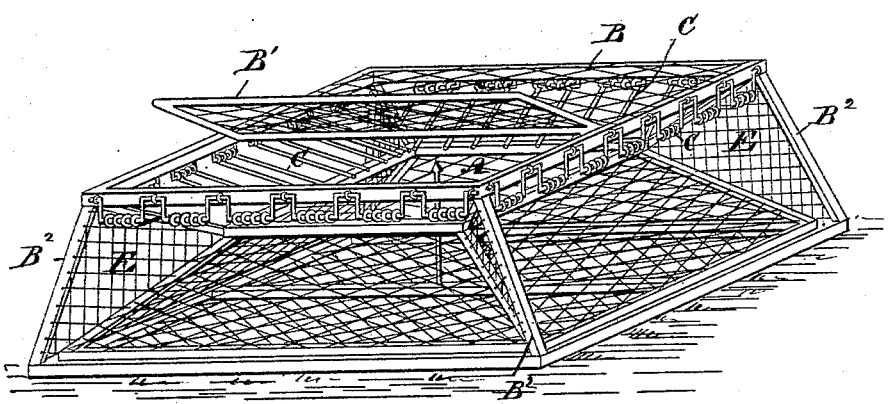
Figure 2:
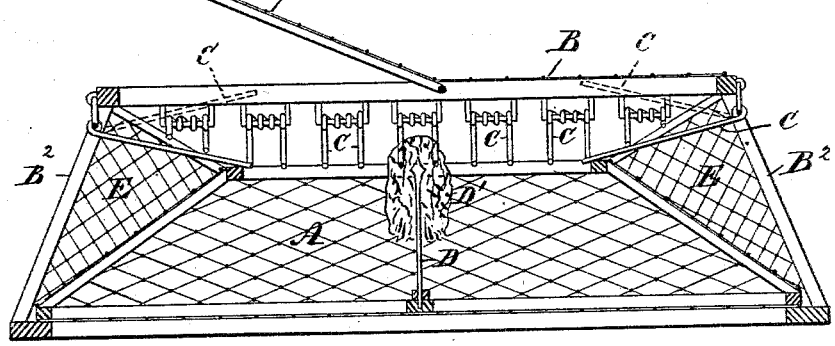
Figure 3:
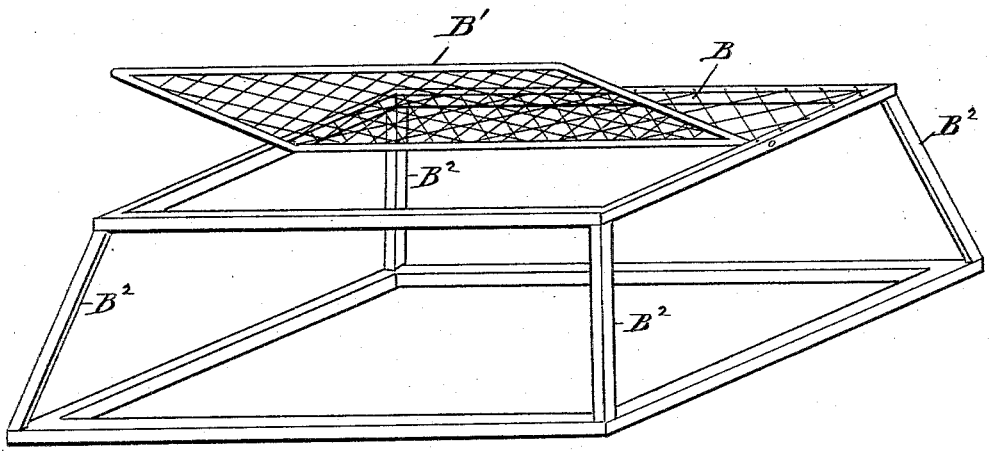
Figure 4:
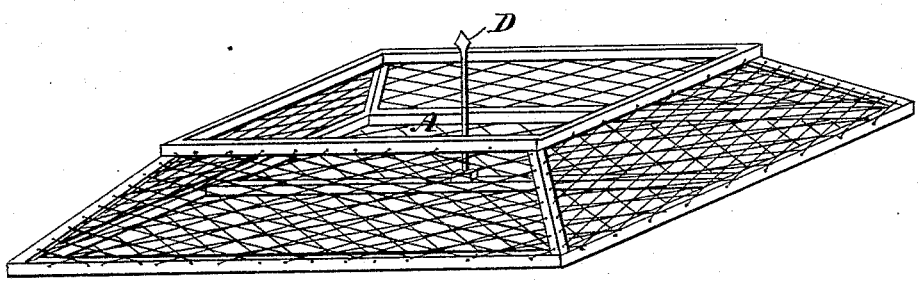

Figure 1 is a perspective view of my improved trap. Fig. 2 is a vertical section of the same. Fig. 3 is a perspective view of the top detached, the fingers omitted; and Fig. 4 is a perspective view of the cage detached.

My invention has for its object to improve the construction of lobster-traps, whereby the trap will be efficient.

My invention consists of a cage having upwardly-converging sides and open at the top; an elevated top extended to project over the sides of the cage to leave an intervening passage or way for entrance to the cage; fingers having one end hinged to said top and resting on the top edge of the cage to close said passage or way against escape, and wings from the sides to lead lobsters to the entrance, as hereinafter set forth.

A is a cage, formed of netting secured to a suitable frame. The sides of said cage converge upwardly, and the cage is open at the top.

B is a top or cover provided with a door B', through which the bait is admitted and the caught lobsters extracted from the cage. The top B is supported in an elevated position above the cage upon posts $B^2$, from a suitable frame or by struts from the cage or other suitable manner, whereby a passage or way will be provided for the entrance of lobsters into the cage, and said top and door may be partly or wholly covered with netting.

C are fingers, one end hinged to the top B, at or near the outer edge, and the free end of the fingers bears on the top edge of the cage, and said fingers cross the passage or way into the cage to close the exit. To obtain access to the bait in the cage, the lobsters will force up a sufficient number of fingers to allow of entrance, and when caged the lifted fingers will fall and prevent escape.

D is the bait-holder, provided with bait D', and said bait may be inclosed in a balloon or other shaped netting to prevent consumption by small fish.

E are wings extending outwardly from the sides of the cage diagonally from the corners to lead lobsters to the entrance of the cage.

I claim as my invention—

A lobster-trap comprising a cage A, open at the top and having upwardly-converging sides, a top B, elevated above the cage and projecting over the sides, fingers C, hinged to said top and falling across the top edge of the cage to close the entrance, and wings E, leading up to the entrance, as set forth.

GEORGE HURST.

Witnesses:
J. W. YOUNG,
B. P. YOUNG.